(12) United States Patent
Rigaud et al.

(10) Patent No.: US 9,924,833 B2
(45) Date of Patent: Mar. 27, 2018

(54) SELF-CONTAINED TROLLEY FOR TEMPERATURE CONDITIONING AND DISTRIBUTION OF MEAL TRAYS

(71) Applicant: COLDWAY, Pia (FR)

(72) Inventors: Laurent Rigaud, Pia (FR); Francis Kindbeiter, Pia (FR)

(73) Assignee: COLDWAY, Pia (FR)

( * ) Notice: Subject to any disclaimer, the term of this patent is extended or adjusted under 35 U.S.C. 154(b) by 845 days.

(21) Appl. No.: 14/361,766

(22) PCT Filed: Dec. 21, 2012

(86) PCT No.: PCT/FR2012/053052
§ 371 (c)(1),
(2) Date: May 30, 2014

(87) PCT Pub. No.: WO2013/098516
PCT Pub. Date: Jul. 4, 2013

(65) Prior Publication Data
US 2015/0027661 A1      Jan. 29, 2015

(30) Foreign Application Priority Data

Dec. 27, 2011   (FR) ..................................... 11 04115

(51) Int. Cl.
*F25D 31/00*       (2006.01)
*F25D 3/12*        (2006.01)
(Continued)

(52) U.S. Cl.
CPC ........... *A47J 39/006* (2013.01); *F25B 29/006* (2013.01); *F25D 3/125* (2013.01); *F25D 31/005* (2013.01); *F25D 2400/20* (2013.01)

(58) Field of Classification Search
CPC ........ A47B 2031/026; A47B 2031/005; A47B 31/02; A47J 39/006; F25B 29/006; F25D 3/125

See application file for complete search history.

(56) References Cited

U.S. PATENT DOCUMENTS 3,275,393 A * 9/1966 Conklin ................. A47B 31/02
                                                  219/214
4,974,419 A   12/1990 Sabin et al.
(Continued)

FOREIGN PATENT DOCUMENTS

EP   1 518 486 A1   3/2005
FR   2 766 148 A1   1/1999
(Continued)

OTHER PUBLICATIONS

T.X. Li, et al., "Performance study of a consolidated manganese chloride-expanded graphite compound for sorption deep-freezing processes", Applied Energy, Jul. 1, 2009, pp. 1201-1209, vol. 86, No. 7-8.
(Continued)

Primary Examiner — Elizabeth Martin
Assistant Examiner — Zachary R Anderegg
(74) Attorney, Agent, or Firm — Sughrue Mion, PLLC

(57) ABSTRACT

The present invention relates to a self-contained trolley for temperature conditioning and distribution of meal trays (13) comprising two compartments separated by an insulating wall (11), namely a compartment for heating, called the hot compartment, and a compartment for chilling, called the cold compartment, receiving at least one stack of meal trays arranged so that one part of each meal tray (13) is located in the hot compartment and the other part thereof is located in the cold compartment, wherein the heating of the hot compartment and the chilling of the cold compartment are simultaneously obtained by means of a thermochemical
(Continued)

Figure 4:
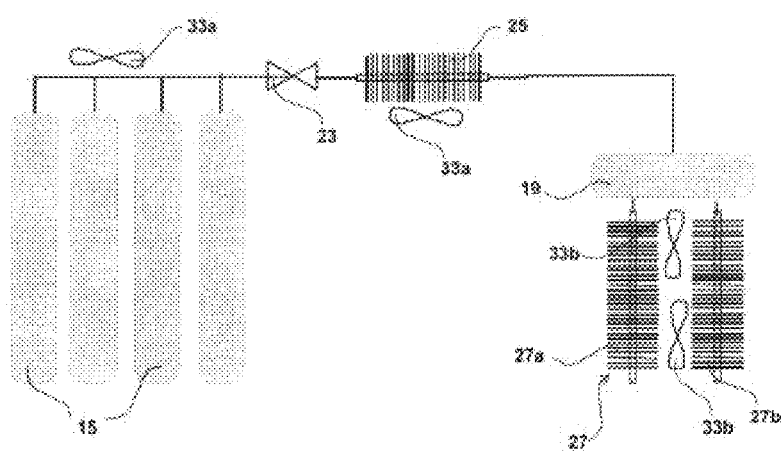

system. This trolley is characterized in that said reactor (15) and the evaporator of the thermochemical system are respectively and exclusively arranged in the hot compartment and in the cold compartment and in that the reactive material used in the thermochemical system consists of a compacted mixture of manganese chloride and expanded natural graphite (ENG), and the gas consists of ammonia.

10 Claims, 3 Drawing Sheets

(51) Int. Cl.
*A47J 39/00* (2006.01)
*F25B 29/00* (2006.01)

(56) References Cited

U.S. PATENT DOCUMENTS

| | | | | | |
|---|---|---|---|---|---|
| 5,159,973 | A | * | 11/1992 | Pennington | A47J 39/006 126/400 |
| 5,875,648 | A | * | 3/1999 | Boye | F25B 35/04 156/172 |
| 5,975,202 | A | * | 11/1999 | Grandi | A47J 39/006 165/48.1 |
| 6,305,186 | B1 | | 10/2001 | Py et al. | |
| 6,427,761 | B1 | | 8/2002 | Georges | |
| 6,802,367 | B1 | * | 10/2004 | Westbrooks, Jr. | A47J 39/006 165/201 |
| 2011/0167864 | A1 | * | 7/2011 | Gu | F25B 15/04 62/476 |
| 2014/0325998 | A1 | * | 11/2014 | Jarvis | A47J 39/003 62/4 |

FOREIGN PATENT DOCUMENTS

| | | |
|---|---|---|
| FR | 2 766 262 A1 | 1/1999 |
| JP | 46-23485 | 8/1971 |
| JP | 3019973 U | 1/1996 |
| JP | 8-061802 A | 3/1996 |
| JP | 10-213359 A | 8/1998 |
| JP | 2002-502950 A | 1/2002 |

OTHER PUBLICATIONS

International Search Report for PCT/FR2012/053052 dated Mar. 6, 2013, which was previously filed May 30, 2014 [PCT/ISA/210].
Communication dated Nov. 1, 2016, issued by the Japanese Patent Office in counterpart application No. 2014-549519.

* cited by examiner

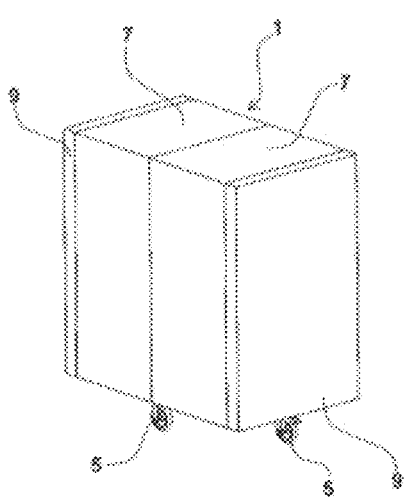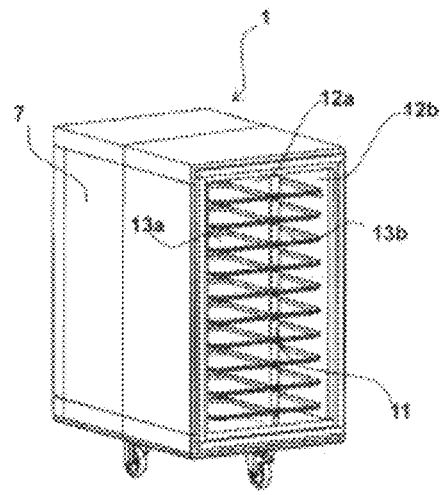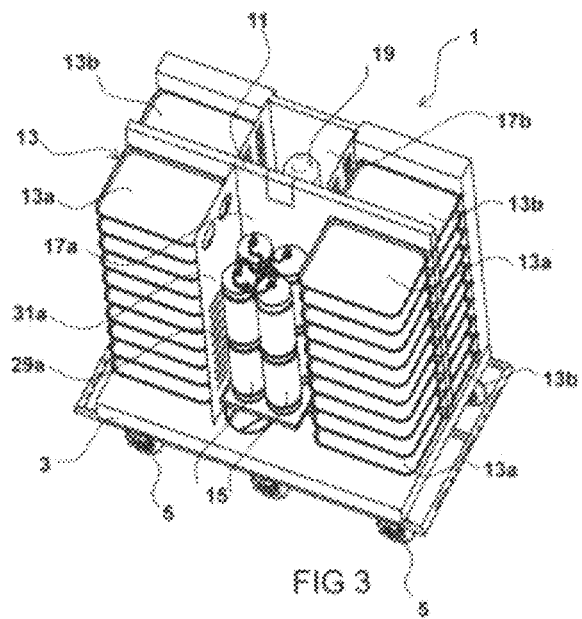

SELF-CONTAINED TROLLEY FOR TEMPERATURE CONDITIONING AND DISTRIBUTION OF MEAL TRAYS

CROSS REFERENCE TO RELATED APPLICATIONS

This application is a National Stage of International Application No. PCT/FR2012/053052 filed Dec. 21, 2012, claiming priority based on French Patent Application No. 11 04115 filed Dec. 27, 2011, the contents of all of which are incorporated herein by reference in their entirety.

The present invention concerns a trolley particularly intended for the distribution of meal trays and for maintaining at temperature the foods contained in said trays.

Such trolleys are found in the domain of catering, and in particular catering in a hospital environment where it is necessary to maintain at temperature foods that must be consumed hot, such as soups, meat and vegetables, and foods that must be consumed cold, such as certain appetizers, cheeses and desserts.

It has been proposed in the prior art, and particularly in U.S. Pat. No. 4,974,419, to use storage cabinets equipped with devices for both heating and refrigeration, enabling the foods they contain to be kept hot or cold, respectively, prior to being distributed to the beneficiaries. Thus, systems have been proposed comprising, for example, an electrical resistance to provide the necessary calories for maintaining products that must be served hot at the correct temperature along with, for example, a compressor device for providing the frigories required to maintain at temperature products that must be served cold.

Such systems are by nature very complex and expensive because they are equipped with both the means to produce heat and the means to produce cold. Moreover, these systems are fixed, and therefore do not allow the foods to be maintained at temperature during the service phase, with the result that, when they are served to the beneficiaries, the hot foods have cooled and the cold foods have become warm.

For this reason meal trays have been proposed, in particular in EP patent 1,518,486, that have two specific zones, namely a so-called "hot zone" in which foods that must be consumed hot are placed, and a "cold zone" in which foods that must be consumed cold are placed. These trays are arranged on specific distribution trolleys comprising two respective internal compartments in which the trays are stacked on racks so that all of the hot zones of the trays are located in a heated space called the "hot compartment" and all of the cold zones of the trays are located in a chilled space called the "cold compartment". However, trolleys of this type are not self-contained in that they are not able to provide heating and cooling of foods during the distribution phase of the meal trays.

Furthermore, self-contained trolleys for transporting meal trays are known. Thus, patent FR 2,766,148 describes a trolley for transporting meal trays wherein the heat and cold necessary for maintaining the food at temperature are furnished, respectively, by two different thermochemical systems, namely two thermochemical systems of the resorption type, i.e. each using two reservoirs containing a gas such as ammonia, connected by a control valve.

It is known that such systems are thermodynamically very inefficient and, to be capable of producing the energy necessary for the operation of such a trolley, would require thermochemical systems of such volume and weight as to be totally prohibitive within the scope of the proposed application.

The purpose of the present invention is to propose a trolley for distributing meal trays that is able to generate simultaneously, and in a self-contained manner, the heat in the hot compartment and the cold in the cold compartment over a sufficient duration to allow the service personnel to properly distribute these meal trays. Moreover, since it is known that the quantity of hot foods contained on a meal tray is about double that of the cold foods, the amount of heat produced must be at least twice the amount of cold.

Thus, the object of the present invention is a self-contained trolley for temperature conditioning and distribution of meal trays comprising two compartments separated by an insulating wall, namely a heating compartment, called the hot compartment, and a cooling compartment, called the cold compartment, receiving at least one stack of meal trays arranged so that one part of each meal tray is located in the hot compartment and the other part thereof is located in the cold compartment, wherein the heating of the hot compartment and the chilling of the cold compartment are obtained simultaneously by means of a thermochemical system of the type comprising at least one reactor, containing a solid reactive material, and a reservoir associated with an evaporator that contains a liquefied gas, in which when the reactor and the reservoir are placed in communication, the liquid gas contained in the reservoir is vaporized, thus absorbing a certain amount of heat and resulting in the production of cold on the evaporator side, and said gas is absorbed by the reactive material, thus generating an exothermic absorption chemical reaction, so that the reactor is the source of a release of heat, and wherein, once the reaction is ended, when the product contained in the reactor is heated, the gas absorbed by the reactive material is released and is then condensed in the evaporator, characterized in that the reactor and the evaporator of the thermochemical system are respectively and exclusively arranged in the hot compartment and in the cold compartment, and in that the reactive material consists of a compacted mixture of manganese chloride and expanded natural graphite (ENG), and the gas consists of ammonia.

The applicant has thus determined that a unique thermochemical system of the aforementioned type is capable of simultaneously furnishing the heat necessary for the hot compartment and the cold necessary for the cold compartment.

Indeed, in such a system, during the direct reaction, i.e. when the gas contained in the reservoir is admitted into the reactor, the gas is vaporized when exiting said reservoir, which results in the production of cold, and simultaneously, according to the aforementioned thermochemical reaction, the gas is absorbed by the reactive product thus generating an exothermic absorption chemical reaction resulting in the production of heat. This heat, which was detrimental in known thermochemical systems for the production of cold and which had to be eliminated, is used here as a source of heat for heating the food.

The choice of such a thermochemical system is particularly interesting in that the amount of heat it produces is at least twice the amount of cold, while it is known that the volume of food deposited in the hot compartment is at least twice that deposited in the cold compartment. To that end the separation wall between the hot compartment and the cold compartment will be arranged in such a way that the surface area of the tray placed in the hot compartment will be at least twice the surface area placed in the cold compartment.

The applicant has determined that the best results are obtained by choosing ammonia for the gas and, for the reactive product, manganese chloride mixed and compacted with an expander thermal binder such as expanded natural graphite, the apparent density of which is preferably between 50 kgm³ and 150 kgm³; the proportion by weight of manganese chloride to expanded natural graphite is preferably between 50% and 90%.

Under these conditions it is possible to obtain a temperature of less than 4° C. in the cold compartment and a temperature of more than 63° C. in the hot compartment; these correspond to standard temperatures in this type of application.

According to the invention, the trolley will comprise two opposing stacks of meal trays, and the reactor and the evaporator will be arranged between said stacks, respectively in the hot compartment and in the cold compartment.

In order to increase its power, the reactor may include a mechanism capable of preheating it prior to the start of the chemical reaction, which mechanism may consist of a power-regulated electric heating collar arranged around the reactor.

Moreover, the trolley may incorporate a mechanism for preheating the hot compartment before the start of the thermochemical reaction. Said preheating mechanism, in one variant of embodiment of the invention, may consist of a mechanism for preheating the reactor.

The thermochemical system may draw upon several reactors, and the preheating mechanisms of said reactors may be managed by control mechanisms that enable the operation of all or some of said reactors to be controlled.

Preferably the reactor will be cylindrical in shape and will be arranged vertically between the opposing stacks of meal trays.

Figure 5:
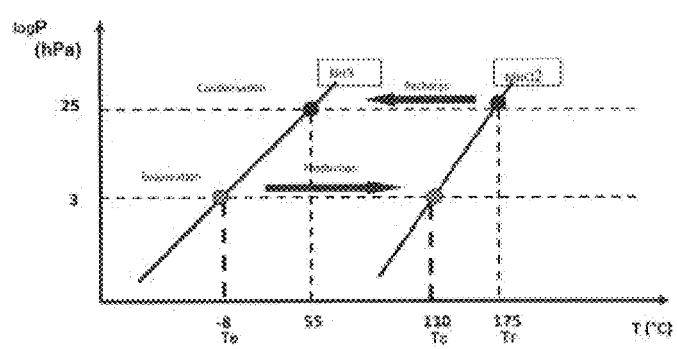
Figure 6:
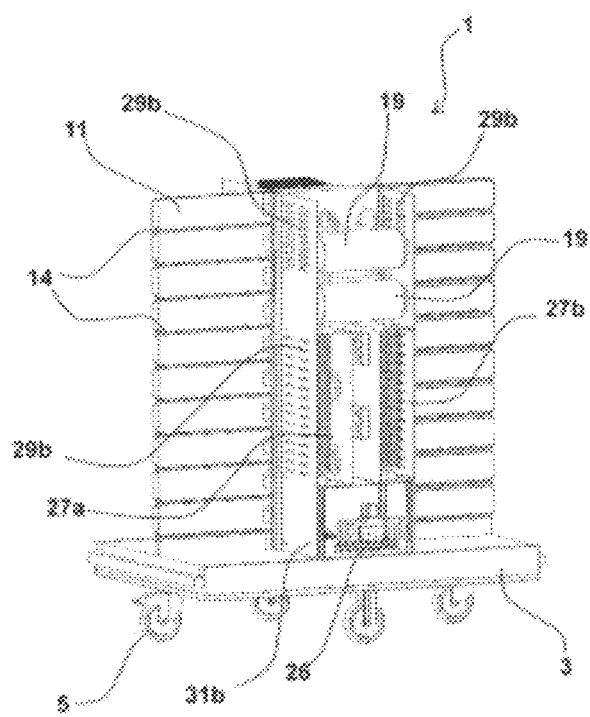

Following is a description, by way of non-limiting example, of several embodiments of the present invention with reference to the appended drawings in which:

FIG. 1 is a view in perspective of a trolley according to the invention,

FIG. 2 is a view in perspective of the trolley represented in FIG. 1, with one of its access doors in the open position, FIG. 3 is a view in perspective of the trolley represented in FIGS. 1 and 2, with the cabinetry removed, FIG. 4 is a schematic view of the thermochemical system implemented in the trolley according to the invention, FIG. 5 is a diagram explaining the operation of the thermochemical system used in the trolley according to the invention, FIG. 6 is a view in perspective of the trolley according to the invention, shown from the side where the reservoir of the thermochemical system is located.

Represented in FIGS. 1 to 4 is a trolley 1 intended for the storage and distribution of meal trays in a hospital environment, which is able to keep one part of said trays hot and the other part thereof cold, during the entire phase of distribution of the meal trays to the patients.

Said trolley 1 consists of a rectangular support frame 3 mounted on wheels 5, which supports a structure forming a double chamber 7 accessible by two opposing doors 9. The two chambers 7 are separated lengthwise by an insulating wall 11 so as to form on one side the compartment called the "hot compartment" 12a and on the other side a compartment called the "cold compartment" 12b.

Meal trays 13 are stacked and mounted by sliding on racks inside said hot and cold compartments, so that one part 13a of each meal tray is located in the hot compartment 12a, and the other part 13b is located in the cold compartment 12b. To that end, the insulating wall 11 is equipped, at the level of each meal tray 13, with a slot 14 intended for the insertion of said meal tray into the rack, with an elastic gasket pressing against the tray in order to prevent thermal exchanges between the hot and cold compartments.

In this embodiment of the invention, a space 17a, called hot space, is provided between the two stacks of trays that are arranged in the hot compartment 12a, said space being intended to receive the hot source from a thermochemical system formed of four cylindrical reactors 15 that are disposed vertically in said space in order to promote a good distribution of the heat towards the stack of trays. Similarly, provided between the two stacks of trays disposed in the cold compartment 12b is a space 17b, called cold space, intended to receive the cold source from the thermochemical system, formed from an ammonia reservoir 19 and an evaporator 27, which is disposed vertically in said space in order to promote a good distribution of the frigories.

The applicant has established that by placing the heating and cooling mechanisms directly in the respective hot and cold compartments, the thermal exchanges in these compartments are significantly improved by enabling a homogeneous heating and cooling, respectively, of the foods.

The thermochemical system represented in the outline diagram of FIG. 4 comprises four reactors 15 each containing a reactive product, consisting of manganese chloride which is mixed and compacted with an expander binder composed of expanded natural graphite, the apparent density of which is preferably between 50 kgm³ and 150 kgm³; the proportion by weight of manganese chloride to expanded natural graphite is preferably between 50% and 90%.

Said reactors 15 are in communication, under the control of a control valve 23 and of a condenser 25, with the reservoir 19 in which a specific gas consisting of ammonia is stored, said reservoir being in communication with the evaporator 27.

The reactive product and the gas are such that the reactive product is capable, by an exothermic thermochemical reaction during a so-called operating phase, of absorbing the gas, thus generating a reaction product, and of restoring it by a reverse thermochemical reaction during a so-called regeneration phase, when the reaction product is heated.

Thus, when the reactor (15) and the reservoir (19) are placed in communication, the liquid gas contained in the reservoir (15) is vaporized, which absorbs a certain amount of heat, resulting in the production of cold on the evaporator side, and said gas is absorbed by the reactive material, thus generating an exothermic absorption chemical reaction, so that the reactor (15) is the source of a release of heat. Once the reaction has ended, when the reaction product contained in the reactor (15) is heated, the gas absorbed by the reactive material is released, and this gas is then condensed in the evaporator (27, 27a, 27b).

Thermochemical systems of this type are known and can be implemented with various salts and gases. According to the invention, a selection was made, from among the various possible salt/gas pairs, of a salt and gas pair that is particularly effective for the present application, namely manganese chloride and ammonia; the salt, as previously discussed, was mixed with an expander product consisting of expanded natural graphite the density of which is preferably between 50 kgm³ and 150 kgm³.

Represented in FIG. 5 is a functional diagram of such a thermochemical system. It will be noted in this diagram that, during the operating phase of said thermochemical system, the evaporation temperature $T_e$ is −8° C. which makes it possible to ensure a temperature of less than 4° C. in the cold compartment 12b, and that the temperature $T_c$ of the condenser is 110° C., which makes it possible to ensure a temperature of at least 63° C. in the hot compartment 12a.

The trolley according to the invention thus makes it possible to ensure the heating and cooling of the food that it contains, at the respective recommended temperatures.

Once the trays have been distributed, the regeneration phase of the thermochemical system is initiated by heating the reaction product contained in the reactors 15 to a temperature $T_r$ of 175° C., as shown in the diagram of FIG. 5; this is done, for example, using electric heating collars placed around said reactors, under the control of an electronic management mechanism 26 as detailed hereinafter.

As represented in FIGS. 4 and 6, the gas reservoir consists of two containers (19) which are arranged in the cold compartment 12b, in the upper part of the cold space 17b of said compartment, and the evaporator 27 is formed of two elements 27a and 27b which extend vertically beneath said containers along the stack of trays and which can distribute the cold produced onto said trays through openings 29b which are made in a partition 31b, enabling the transfer of the cold to the meal trays to be controlled.

Arranged beneath the evaporator 23 is the electronic management mechanism 26 as well as a battery for supplying the electronic control system when the trolley is disconnected from the mains.

The four reactors 15 are arranged vertically in the hot compartment 12a, in the hot space 17a of said compartment, effectively encompassing the height of the stack of meal trays; they are able to deliver heat to the meal trays during the operating phase of the thermochemical system through openings 29a made in a partition 31a enabling the transfer of heat to the meal trays to be controlled.

Moreover, in order to promote thermal exchanges between, on the one hand, the heat produced in the hot compartment and the food to be heated, and on the other hand, the cold produced in the cold compartment and the food to be chilled, fans 33a allow the hot air generated by the reactors 15 to be extracted and circulated through specific ducts, not shown in the drawings, which open into each of the spaces between the trays in the hot compartment 12a through the openings 29a.

Similarly, fans 33b extract the cold air generated by the elements 27a and 27b of the evaporator 27 and cause it to circulate in each of the spaces between the trays in the cold compartment 12b via the openings 29b.

According to the invention the reactors 15 can be preheated when they are not yet in service, that is, before the thermochemical system is placed in operation. Such an arrangement allows the system to be more self-contained and to eliminate the phase during which the temperature is raised from the ambient temperature to the desired temperature.

Advantageously, in order to achieve this, the reactors 15 can be equipped with additional heating mechanisms, such as electrical heating sleeves or collars, which can be controlled and their power regulated by the electronic management mechanism 26.

According to the invention, preheating can be activated for all or some of the reactors. Thus, the reactors that are not preheated will have a greater power to absorb the ammonia, resulting in a greater evaporative power, and consequently a faster generation of cold, which is particularly advantageous during the warm-up of the thermochemical system.

In one variant of embodiment of the invention, a mechanism can also be provided to produce heat enabling the preheating of the hot compartment 12a when the trolley is not in service, i.e. when it is being filled with the meal trays or prior to this operation, for example. Such heating may for example be obtained using the mechanism for preheating the reactors, particularly when said reactors are fitted with heating collars or sleeves.

By using the trolley according to the invention in a facility where the temperature is 25° C., the meals for a full day can be maintained at temperature and served to patients by implementing the following operating cycle:

| STAGES | OPERATIONS | DURATION (hrs) |
| --- | --- | --- |
| Breakfast | Fill the trolley with the foods to be heated and chilled | 0.1 |
| | Serve the meal trays to the patients | 1.5 |
| | Operating phase of the thermochemical system Standby | 2.5 |
| Lunch | Fill the trolley with the foods to be heated and chilled | 0.1 |
| | Serve the meal trays to the patients | 1.5 |
| | Operating phase of the thermochemical system Standby | 3.5 |
| Dinner | Fill the trolley with the foods to be heated and chilled | 0.1 |
| | Serve the meal trays to the patients | 1.5 |
| | Operating phase of the thermochemical system Recharging phase for the thermochemical system | 6.5 |

Thus, unlike trolleys of the prior art, the present invention makes it possible to have a totally self-contained operation for a full day.

The invention claimed is:

1. A self-contained trolley for temperature conditioning and distribution of meal trays, comprising two compartments separated by an insulating wall, namely a heating compartment, called hot compartment, and a cooling compartment, called cold compartment, said trolley comprising two opposing stacks of meal trays, respectively a first stack and a second stack, one part of each meal tray of said first stack being placed in said hot compartment, another part of each meal tray of said first stack being placed in said cold compartment and one part of each meal tray of said second stack being placed in said hot compartment, another part of each meal tray of said second stack being placed in said cold compartment; and, wherein the heating of the hot compartment and the chilling of the cold compartment are obtained simultaneously by means of a thermochemical system of the type comprising at least one reactor, containing a solid reactive material and at least one reservoir associated with an evaporator that contains a liquefied gas in which, when the reactor and the reservoir are placed in communication, the liquid gas contained in the reservoir is vaporized, which absorbs a certain amount of heat, with the result that cold is produced on the evaporator side, and this gas is absorbed by the reactive material thus generating an exothermic absorption chemical reaction, so that the reactor is the source of a release of heat, and wherein, once the reaction is ended, when a product formed by the reaction between said reactive material and said gas which is contained in the reactor is heated, the gas absorbed by said reactive material is released and is then condensed in the evaporator, wherein the reactor and the evaporator of the thermochemical system are respectively and exclusively arranged in the hot compartment and in the cold compartment, the reactor and the evaporator being arranged in a space between said two opposing first and second stacks, respectively in the hot compartment and in the cold compartment and the reactive material comprises a compacted mixture of manganese chloride and expanded natural graphite, and the gas comprises ammonia.

2. The trolley according to claim 1, wherein the apparent density of the expanded natural graphite is between 50 kg/m3 and 150 kg/m3.

3. The trolley according to claim 1, wherein the proportion by weight of manganese chloride to the expanded natural graphite is between 50% and 90%.

4. The trolley according to claim 1, the reactor includes mechanisms capable of preheating it prior to the start of the thermochemical reaction, which mechanisms comprise a power-regulated electric heating collar arranged around it.

5. The trolley according to claim 1, comprising a power regulated electric heating collar for preheating the hot compartment before initiating the thermochemical reaction.

6. The trolley according to claim 4, wherein the thermochemical system uses several reactors and the power-regulated electric heating collars of said reactors are managed by control mechanisms that enable the operation of all or some of said reactors to be controlled.

7. The trolley according to claim 1, wherein the reactor is cylindrical in shape and is arranged vertically between the opposing stacks of meal trays.

8. The trolley according to claim 1, wherein the insulating wall between the hot compartment and the cold compartment is arranged so that the surface area of the tray placed in the hot compartment is at least twice the surface area placed in the cold compartment.

9. A self-contained trolley for temperature conditioning and distribution of meal trays, comprising:
   a hot compartment and a cold compartment separated from the hot compartment by an insulating wall;
   a first stack for meal trays and a second stack for meal trays, wherein one part of each meal tray of the first stack is located in the hot compartment and another pert of each meal tray of the first stack is located in the cold compartment, and wherein one part of each meal tray of the second stack is located the hot compartment and another part of each meal tray of the second stack is located in the cold compartment; and
   a thermochemical system configured to heat the hot compartment and to cool the cold compartment simultaneously, the thermochemical system comprising a reactor containing a solid reactive material and a reservoir associated with an evaporator containing a liquefied gas; the reactor and the reservoir are in communication and the thermochemical system is operational so that the liquefied gas contained in the reservoir is vaporized, absorbing heat and resulting in a reduction of temperature on the evaporator side, and the gas is absorbed by the reactive material thus generating an exothermic absorption chemical reaction, so that the reactor is a source of a heat released, and wherein, after the reaction ends, when a product formed by the reaction between the reactive material and the gas contained in the reactor is heated, the gas absorbed by the reactive material is released and is then condensed in the evaporator, wherein the reactor and the evaporator of the thermochemical system are respectively and exclusively located in the hot compartment and in the cold compartment and in a space between the first stack of meal trays and the second stack of meal trays, so that the one part of each meal tray of the first stack and the one part of the meal tray of the second stack share and are heated by the same reactor located in the space between the first stack of meal trays and the second stack of meal trays, and so that the another part of each meal tray of the first stack and the another part of the meal tray of the second stack share and are cooled by the same evaporator located in the space between the first stack of meal trays and the second stack of meal trays; and
   wherein the reactive material comprises a mixture of manganese chloride and natural graphite, and the gas comprises ammonia.

10. The trolley according to claim 9, comprising a heater for preheating the hot compartment before initiating the thermochemical reaction.

* * * * *